US012745147B2

(12) United States Patent
Zhu

(10) Patent No.: US 12,745,147 B2
(45) Date of Patent: Sep. 22, 2026

(54) METHOD AND APPARATUS FOR DETERMINING SATELLITE FREQUENCY BAND, AND METHOD AND APPARATUS FOR ADJUSTING FREQUENCY BAND

(71) Applicant: BEIJING XIAOMI MOBILE SOFTWARE CO., LTD., Beijing (CN)

(72) Inventor: Yajun Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 425 days.

(21) Appl. No.: 18/280,466

(22) PCT Filed: Mar. 10, 2021

(86) PCT No.: PCT/CN2021/079994

§ 371 (c)(1),
(2) Date: Sep. 5, 2023

(87) PCT Pub. No.: WO2022/188064

PCT Pub. Date: Sep. 15, 2022

(65) Prior Publication Data

US 2024/0155451 A1 May 9, 2024

(51) Int. Cl.

*H04W 36/06* (2009.01)
*H04W 48/16* (2009.01)
*H04W 72/0453* (2023.01)

(52) U.S. Cl.

CPC .......... *H04W 36/06* (2013.01); *H04W 48/16* (2013.01); *H04W 72/0453* (2013.01)

(58) Field of Classification Search

CPC .. H04B 7/1851; H04W 72/541; H04W 16/14; H04W 36/06

See application file for complete search history.

(56) References Cited

U.S. PATENT DOCUMENTS

| | | | | |
|---|---|---|---|---|
| 5,963,865 A * | 10/1999 | Desgagne | H04W 36/302 455/450 |
| 8,923,849 B2 | 12/2014 | Monte et al. | |
| 2002/0041575 A1* | 4/2002 | Karabinis | H04B 7/18563 455/447 |
| 2006/0205367 A1* | 9/2006 | Karabinis | H04B 7/18513 455/95 |

(Continued)

FOREIGN PATENT DOCUMENTS

| | | |
|---|---|---|
| CN | 112290989 A | 1/2021 |
| CN | 112383323 A | 2/2021 |

OTHER PUBLICATIONS

International Search Report issued in Application No. PCT/CN2021/079994, dated Nov. 18, 2021 with English translation, (4p).

(Continued)

*Primary Examiner* — James P Duffy

(74) *Attorney, Agent, or Firm* — Arch & Lake ILP; Hao Tan; Shen Wang

(57) ABSTRACT

A method for determining satellite frequency bands includes: determining at least one first frequency band available for a land communication system in a current region; and determining on the basis of the at least one first frequency band, at least one second frequency band available for a satellite communication system in the current region.

9 Claims, 8 Drawing Sheets

(56) References Cited

U.S. PATENT DOCUMENTS

2015/0079977 A1 3/2015 Park et al.
2019/0124584 A1* 4/2019 Parikh .................. H04W 16/14
2019/0239082 A1 8/2019 Ravishankar

OTHER PUBLICATIONS

The extended European search report of EP Application No. 21929543.3 dated Nov. 25, 2024, (8p).
European Patent Office Communication pursuant to Article 94(3) EPC for Application No. 21929543.3, dated Jan. 19, 2026 (7p).

* cited by examiner

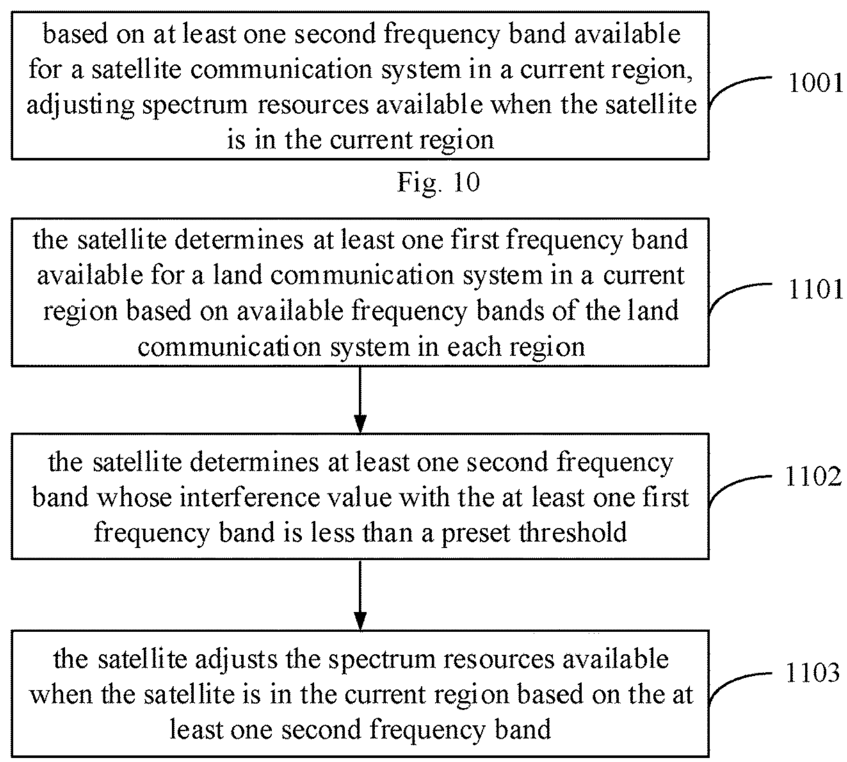
Fig. 10
Fig. 11
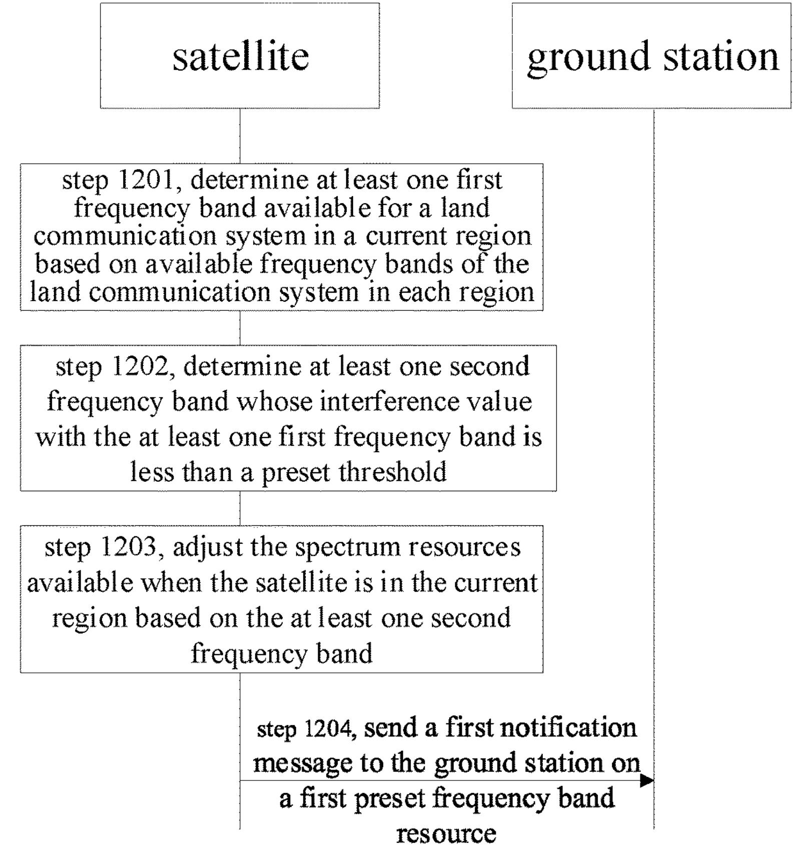
Fig. 12 ground station (or base station set on the ground)

satellite step 1301, determine at least one first frequency band available for the land communication system in the current region step 1302, determine at least one second frequency band whose interference value with the at least one first frequency band is less than the preset threshold step 1303, determine that the satellite arrives in the current region, and send a second notification message to the satellite on the second preset frequency band resource step 1304, adjust the available spectrum resources when the satellite is in the current region based on at least one second frequency band indicated by the second notification message and the indication of the base station

Fig. 13

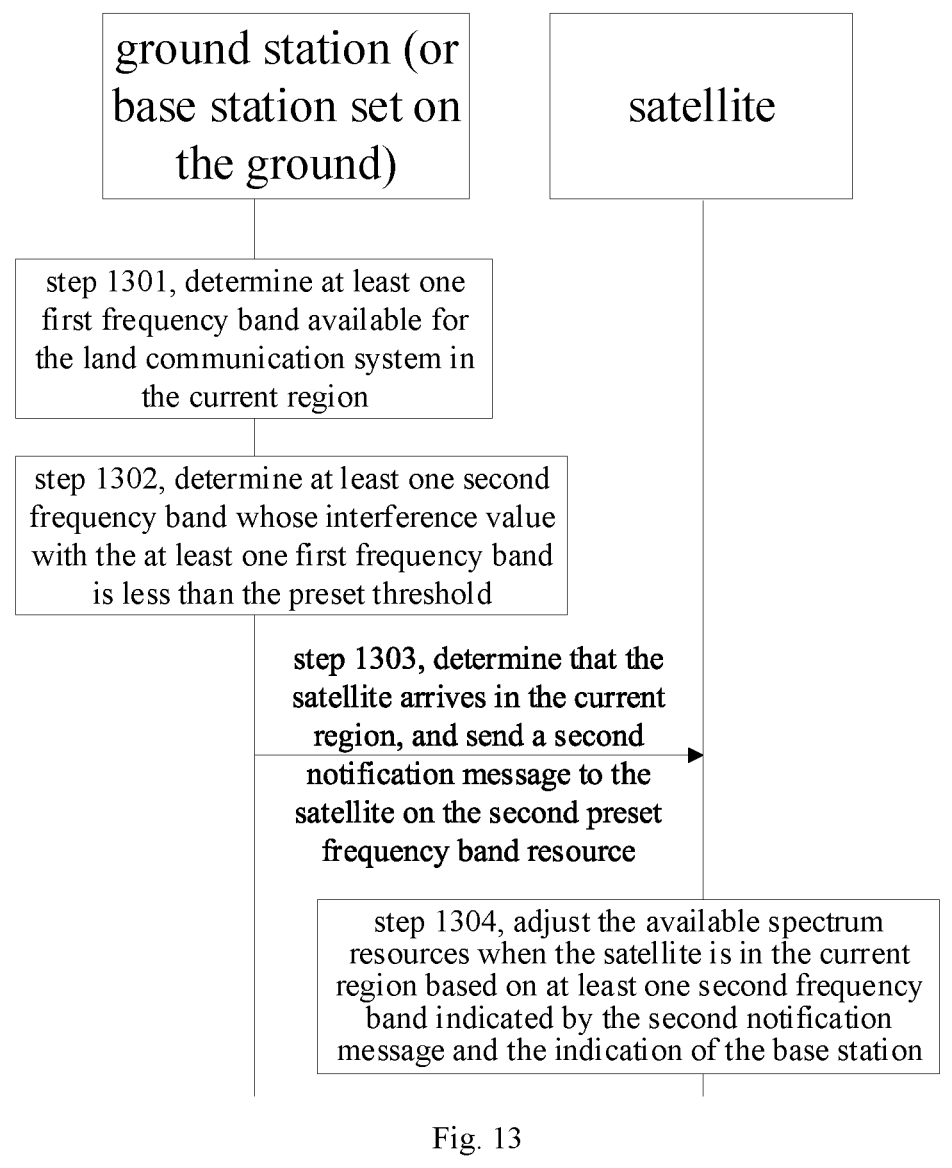

METHOD AND APPARATUS FOR DETERMINING SATELLITE FREQUENCY BAND, AND METHOD AND APPARATUS FOR ADJUSTING FREQUENCY BAND

CROSS-REFERENCE TO RELATED APPLICATION

This application is the US national phase application of International Application No. PCT/CN2021/079994, filed on Mar. 10, 2021, the entire contents of which are incorporated herein by reference for all purposes.

TECHNICAL FIELD

The disclosure relates to the field of communication technologies, and in particular, to a method and an apparatus for determining satellite frequency bands, and a method and an apparatus for adjusting frequency bands.

BACKGROUND

In the research of wireless communication technology, satellite communication is considered an important aspect of future wireless communication technology development. Satellite communication refers to the communication carried out by radio communication equipment on the ground using satellites as relays. The satellite communication system consists of a satellite part and a terrestrial part. The characteristics of satellite communication are: large communication range; communication between any two points as long as they are within the range covered by radio waves emitted by the satellite; not easily affected by land disasters (high reliability). Satellite communication, as a supplement to the current land cellular communication system, can have the following benefits. Firstly, it can achieve extended coverage. For areas where the current cellular communication system cannot cover or has high coverage costs, such as oceans, deserts, remote mountainous areas, etc., satellite communication can be used to solve communication problems. Secondly, emergency communication can be carried out, such as using satellite communication to quickly establish communication connections in extreme situations such as disasters that result in the unavailability of cellular communication infrastructure. In addition, it can also provide industry applications. For example, for delay sensitive services transmitted over long distances, satellite communication can be used to reduce the delay of service transmission.

It can be foreseen that in future wireless communication systems, satellite communication systems and land cellular communication systems will gradually achieve deep integration, truly realizing the intelligent connection of all things.

At present, there may be severe co-frequency interference or adjacent-frequency interference between available frequency bands of satellites in satellite communication systems, especially low earth orbit satellites, and available frequency bands of land communication systems. Even if interference can be avoided as much as possible through frequency band planning, it can still lead to interference issues due to inconsistent frequency band allocation methods for satellite communication systems and land communication systems in various regions around the world.

SUMMARY

In order to overcome the problems existing in the related art, embodiments of the present disclosure provide a method and an apparatus for determining satellite frequency bands, and a method and an apparatus for adjusting frequency bands.

According to embodiments of a first aspect of the present disclosure, a method for determining satellite frequency bands is provided. The method includes:

determining at least one first frequency band available for a land communication system in a current region;

determining at least one second frequency band available for a satellite communication system in the current region, based on the at least one first frequency band.

According to embodiments of a second aspect of the present disclosure, a method for determining satellite frequency bands is provided. The method includes:

performing interference detection on at least one first frequency band available for a land communication system in a current region, to obtain an interference detection result; and determining at least one second frequency band available for a satellite communication system in the current region from the at least one first frequency band based on the interference detection result.

According to embodiments of a third aspect of the present disclosure, a method for adjusting frequency bands is provided. The method is applied to a satellite, and includes:

adjusting spectrum resources available when the satellite is in a current region, based on at least one second frequency band available for a satellite communication system in the current region.

According to embodiments of a fourth aspect of the present disclosure, an apparatus for determining satellite frequency bands is provided. The apparatus includes:

a processor; and a memory configured to store instructions executable by the processor, wherein the processor is configured to implement the method for determining satellite frequency bands described in any of the first aspect or the second aspect.

According to embodiments of a fifth aspect of the present disclosure, an apparatus for adjusting frequency bands is provided. The apparatus includes:

a processor; and a memory configured to store instructions executable by the processor, wherein the processor is configured to implement the method for adjusting frequency bands described in any of the third aspect.

It should be understood that the general description above and the detailed description in the following are only illustrative and explanatory, and do not limit embodiments of the present disclosure.

BRIEF DESCRIPTION OF THE DRAWINGS

The accompanying drawings here are incorporated into the specification and form a part of this specification, showing embodiments in accordance with the present application and used together with the specification to explain the principles of the present application.

FIG. 4 is a schematic flowchart of another method for determining satellite frequency bands according to an exemplary embodiment.

FIG. 5 is a schematic flowchart of another method for determining satellite frequency bands according to an exemplary embodiment.

FIG. 10 is a schematic flowchart of a method for adjusting frequency bands according to an exemplary embodiment.

FIG. 11 is a schematic flowchart of a method for determining satellite frequency bands and adjusting frequency bands according to an exemplary embodiment.

FIG. 12 is a schematic flowchart of another method for determining satellite frequency bands and adjusting frequency bands according to an exemplary embodiment.

FIG. 13 is a schematic flowchart of another method for determining satellite frequency bands and adjusting frequency bands according to an exemplary embodiment.

DETAILED DESCRIPTION

The exemplary embodiments will be described in detail here, and examples thereof are shown in the accompanying drawings. When the following descriptions refer to the accompanying drawings, unless otherwise indicated, the same numbers in different drawings represent the same or similar elements. The implementations described in the following exemplary embodiments do not represent all implementations consistent with embodiments of the present disclosure. Rather, they are merely examples of apparatuses and methods consistent with some aspects of the disclosure.

The terms described in the embodiments of the present disclosure are only for the purpose of describing specific embodiments and are not intended to limit the embodiments of the present disclosure. The singular forms "a", "the" used in the embodiments of the disclosure and the appended claim are also intended to include plural forms, unless the context clearly indicates otherwise. It should also be understood that the term "and/or" used in the present disclosure means and includes any or all possible combinations of one or more associated listed items.

It should be understood that, although the terms first, second, third, etc. may be used in embodiments of the present disclosure to describe various information, such information shall not be limited to these terms. These terms are only used to distinguish the same category of information. For example, subject to the scope of embodiments of the present disclosure, first information may also be referred to as second information, and similarly, and second information may also be referred to as first information. It depends on the context. For example, the word "in case of", "if" as used herein may be interpreted as "in a case that" or "when" or "in response to determining".

In satellite networks, LEO (Low Earth Orbit) satellites, as typical NGSO (Non Geostationary Orbit) satellites, have significant advantages in transmission delay and link loss due to their small distance to the ground, attracting more attention from academia and industry.

Figure 1:
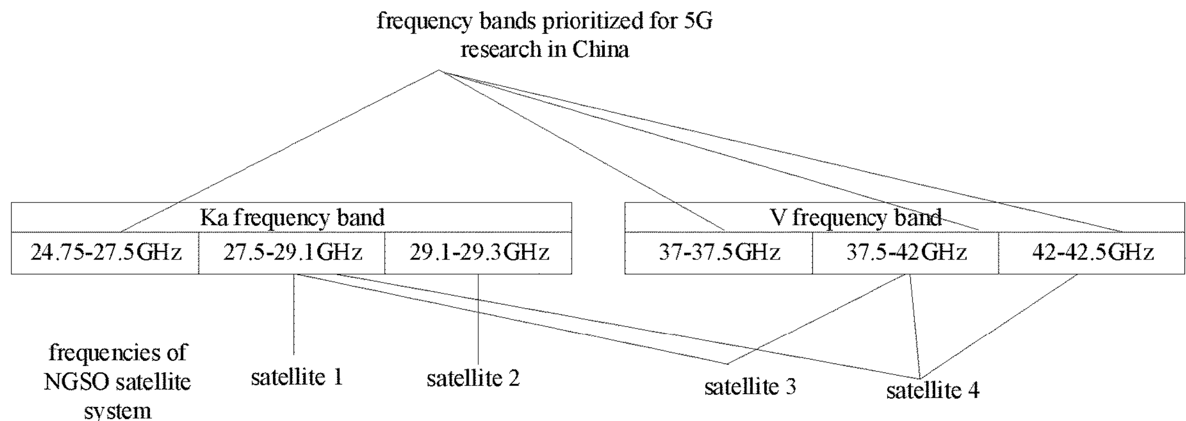
FIG. 1 is a schematic diagram of a scenario of frequency sharing between NGSO satellite internet and 5G system according to an exemplary embodiment.

The 3GPP (Third Generation Partnership Project) has been conducting research on LEO satellite-ground integration since Release 14. Currently, 3GPP is actively promoting the application of satellite access in 5G networks (5th generation mobile networks) and researching solutions for non-terrestrial networks supported by 5G new radio. Frequency resources are an important fundamental support for the commercial use of satellite internet, and due to the scarcity of frequency resources, NGSO has to share a portion of spectrum resources with other wireless network communication systems, for example, as shown in FIG. 1, the frequency sharing between NGSO satellite internet and China's prioritized land 5G system. This can lead to serious co-frequency interference or adjacent-frequency interference if electromagnetic frequencies cannot be well coordinated.

The current challenge is how to propose corresponding countermeasures to address the key issue of frequency resource scarcity in the development of low earth orbit satellite internet constellations. At present, interference avoidance between satellite communication systems and land communication systems is often achieved through frequency band planning. However, due to the inconsistent frequency allocation methods for satellite communication and land communication in various regions around the world, there may still be interference issues.

In order to solve the above problems, this disclosure provides a scheme for determining satellite frequency bands and adjusting frequency bands, which can effectively solve the interference problem between the satellite communication system and the land communication system.

First, the scheme for determining satellite frequency bands provided in this disclosure is introduced, including but not limited to any of the following implementation.

In the first implementation, when the satellite arrives in different regions, available frequency bands in the current region are automatically determined.

Figure 2:
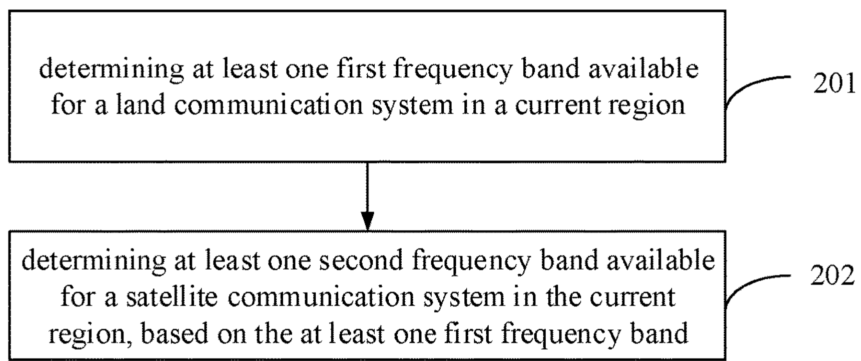
FIG. 2 is a schematic flowchart of a method for determining satellite frequency bands according to an exemplary embodiment.

An embodiment of the present disclosure provides a method for determining satellite frequency bands, as shown in FIG. 2. FIG. 2 is a flowchart of a method for determining satellite frequency bands according to on an embodiment, which may be applied to a satellite. The method may include the following steps.

In step 201, at least one first frequency band available for a land communication system in a current region is determined.

In step 202, at least one second frequency band available for a satellite communication system in the current region is determined based on the at least one first frequency band.

In the above embodiment, the satellite can first determine at least one first frequency band available for the land communication system in the current region, and further, based on the at least one first frequency band, determine a frequency band whose interference value with at least one first frequency band is smaller, thereby obtaining at least one second frequency band available for the satellite communication system in the current region. The satellite can subsequently adjust its available spectrum resources based on the at least one second frequency band, effectively solving the interference problem between the satellite communication system and the land communication system.

Figure 3:
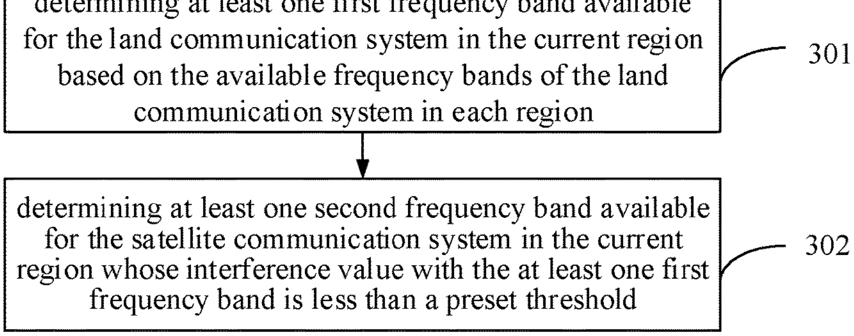
FIG. 3 is a schematic flowchart of another method for determining satellite frequency bands according to an exemplary embodiment.

An embodiment of the present disclosure provides a method for determining satellite frequency bands, as shown in FIG. 3. FIG. 3 is a flowchart of a method for determining satellite frequency bands according to an embodiment, which may be applied to a satellite. The method may include the following steps.

In step 301, at least one first frequency band available for the land communication system in the current region is determined based on the available frequency bands of the land communication system in each region.

In embodiments of the present disclosure, the satellite may obtain the frequency band usage in various regions around the world in advance, that is, obtain the frequency bands available for the land communication system in each region in advance, and determine the current region where the satellite is located based on at least one item of ephemeris information and current geographic location information. Thus, at least one first frequency band available for the land communication system in the current region can be determined. Here, the ephemeris information may be used to indicate the predetermined location of the satellite within a certain time period, but is not limited to this.

In step 302, at least one second frequency band available for the satellite communication system in the current region whose interference value with the at least one first frequency band is less than a preset threshold is determined.

In embodiments of the present disclosure, the satellite may determine at least one second frequency band whose interference value with the at least one first frequency band is less than the predetermined threshold, after determining at least one first frequency band. The satellite can use the spectrum resource corresponding to the at least one second frequency band for communication in the current region. In one possible implementation, the number of first frequency bands is one, and the number of second frequency bands may be one or more. The interference value between each second frequency band and the first frequency band may be less than the preset threshold. In another possible implementation, the number of first frequency bands is multiple, the number of second frequency bands is one, and the interference value between the second frequency band and each first frequency band may be less than the preset threshold. In another possible implementation, the number of first frequency bands is multiple, and the number of second frequency bands is also multiple. The interference value between each second frequency band and at least one first frequency band may be less than the preset threshold.

In the above embodiment, the satellite can determine at least one first frequency band available for the land communication system in the current region based on the frequency bands available for the land communication system in each region which are obtained in advance. Furthermore, based on the at least one first frequency band, the frequency band whose interference value with at least one first frequency band is less than the preset threshold can be determined to obtain at least one second frequency band available for the satellite communication system in the current region. The satellite can subsequently adjust its available spectrum resources based on at least one second frequency band, effectively solving the interference problem between satellite communication system and land communication system.

In one possible implementation, the satellite dynamically adjusts its spectrum resources after determining at least one available second frequency band, without the need to inform the ground station. Correspondingly, terminals in the current region can search for satellite signals on all possible frequency bands of the satellite, in order to obtain service frequency bands of the satellite.

In the above embodiments, the function of the base station can be located on a satellite, while the functions of the core network and application services can also be located on the satellite. The satellite determines at least one available second frequency band in different regions, and there is no need to inform the ground station of the at least one second frequency band. The terminal will search for satellite signals on all possible frequency bands used by the satellite, in order to obtain the service frequency band of the satellite. This effectively solves the interference problem between the satellite communication system and the land communication system, and has high usability.

In another possible implementation, the satellite dynamically adjusts its spectrum resources after determining at least one available second frequency band, and the satellite can inform the ground station of at least one second frequency band, so that after the ground station determines the service frequency band used by the satellite, the terminal can directly search for satellite signals on the service frequency band of the satellite. Similarly, the function of the base station can be located on the satellite, while the functions of the core network and application services can also be located on satellite.

Correspondingly, the present disclosure provides a method for determining satellite frequency bands, as shown in FIG. 4. FIG. 4 is a flowchart of a method for determining satellite frequency bands according to an embodiment, which may be applied to a satellite. The method may include the following steps.

In step 401, at least one first frequency band available for the land communication system in the current region is determined based on the frequency bands available for the land communication system in each region.

In embodiments of the present disclosure, the satellite can obtain the frequency band usage in various regions around the world in advance, that is, obtain the frequency bands available for the land communication system in each region in advance, and determine the current region where the satellite is located based on at least one item of ephemeris information and current geographic location information. Thus, at least one first frequency band available for the land communication system in the current region can be determined. Here, the ephemeris information can be used to indicate the predetermined location of the satellite within a certain time period.

In step 402, at least one second frequency band available for the satellite communication system in the current region whose interference value with at least one first frequency band is less than a preset threshold is determined.

In embodiments of the present disclosure, the satellite can determine at least one second frequency band whose interference value with at least one first frequency band is less than the predetermined threshold, after determining at least one first frequency band. The satellite can use spectrum resource corresponding to the at least one second frequency band for communication in the current region.

In step 403, a first notification message is sent to the ground station on a first preset frequency band resource, in which the first notification message is used to indicate at least one second frequency band available for the satellite in the current region.

In embodiments of the present disclosure, the first preset frequency band resource is the frequency band resource available for the satellite to send the first notification message in the current region as agreed in the protocol. The first preset frequency band resources corresponding to different regions may be the same or different, which is not limited in this disclosure. After determining at least one second frequency band, the satellite can send the first notification message to the ground station on the first preset frequency band resource agreed in the protocol. The first notification message can be used to indicate the at least one second frequency band available for the satellite in the current region.

In the above embodiments, at least one second frequency band determined by the satellite can be sent to the ground station, so that the ground station can determine the service frequency band used by the satellite and inform the terminal of the service frequency band used by the satellite. The terminal can directly search for satellite signals on the service frequency band of the satellite, effectively solving the interference problem between the satellite communication system and the land communication system, while saving terminal resources of the terminal for searching for satellite signals.

In the second implementation, the frequency bands available for the satellite communication system in the current region are determined by the ground equipment. The ground equipment includes but is not limited to independent ground stations, independent base stations, or base stations that integrate functions of ground stations.

Referring to FIG. 5, which is a flowchart of a method for determining satellite frequency bands according to an embodiment, the method may be applied to a ground station or a base station installed on the ground. The method may include the following steps.

In step 501, at least one first frequency band available for a land communication system in a current region is determined.

In embodiments of the present disclosure, the ground station or the base station located on the ground can determine at least one first frequency band available for the land communication system in the current region based on protocol agreements.

In step 502, at least one second frequency band available for a satellite communication system in the current region is determined based on the at least one first frequency band.

Optionally, the ground station or the base station located on the ground can determine the at least one second frequency band whose interference value with the at least one first frequency band is less than a preset threshold, after determining the at least one first frequency band.

In the above embodiments, the ground station or the base station located on the ground can determine at least one second frequency band available for the satellite based on the at least one first frequency band available for the land communication system in the current region, so that when the satellite arrives in the current region, the ground station or the base station located on the ground can inform the satellite of the at least one second frequency band, which can also effectively solve the interference problem between the satellite communication system and the land communication system.

Figure 6:
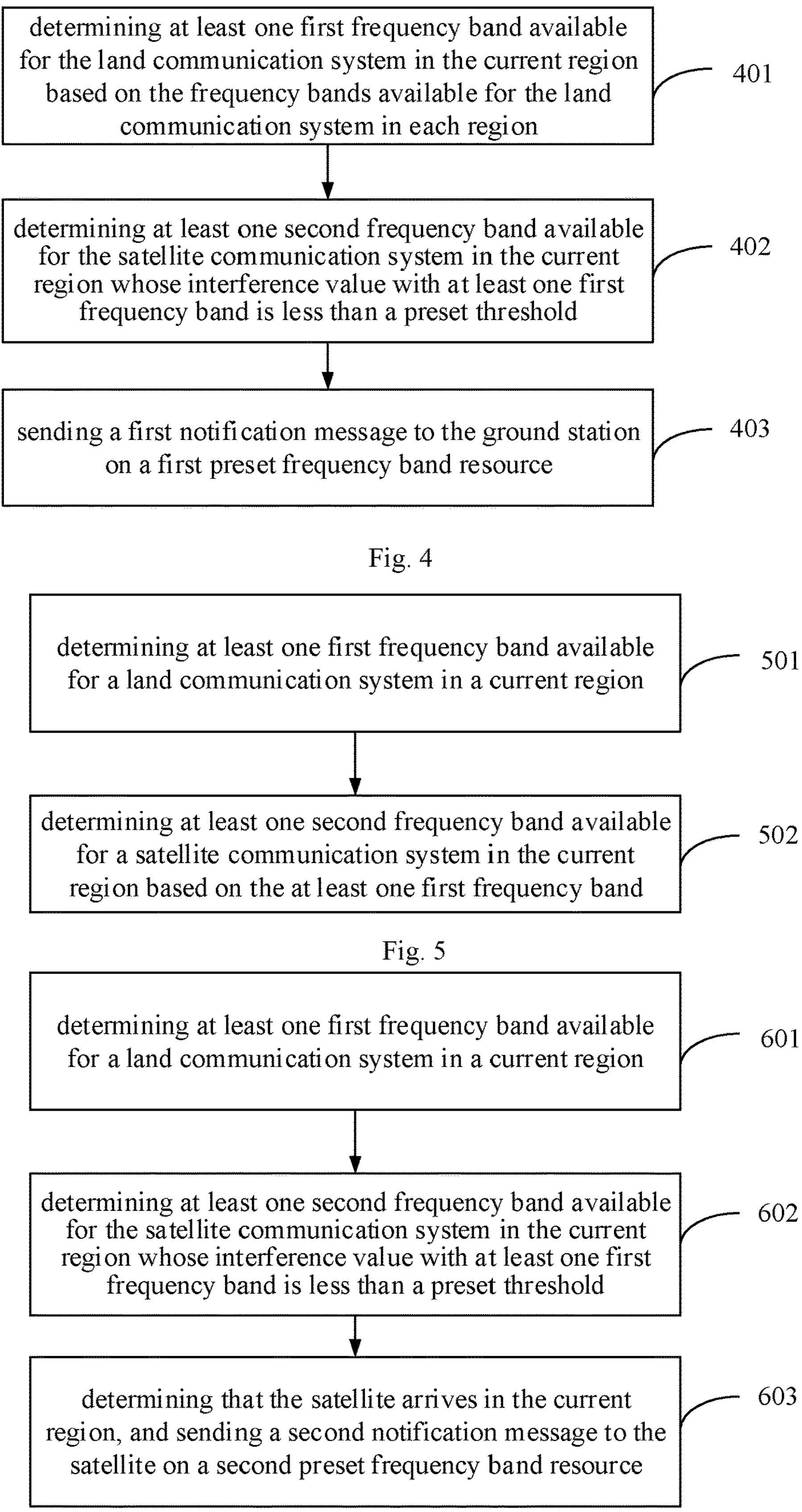
FIG. 6 is a schematic flowchart of another method for determining satellite frequency bands according to an exemplary embodiment.

Referring to FIG. 6, which is a flowchart of a method for determining satellite frequency bands according to an embodiment, the method may be applied to a ground station or a base station installed on the ground. The method may include the following steps.

In step 601, at least one first frequency band available for a land communication system in a current region is determined.

In embodiments of the present disclosure, the ground station or the base station installed on the ground can determine at least one first frequency band available for the land communication system in the current region based on protocol agreements.

In step 602, at least one second frequency band whose interference value with the at least one first frequency band is less than a preset threshold is determined.

In embodiments of the present disclosure, after determining at least one first frequency band, the ground station or the base station installed on the ground can determine at least one second frequency band whose interference value with the at least one first frequency band is less than the preset threshold.

In step 603, it is determined that the satellite arrives in the current region, and a second notification message is sent to the satellite on a second preset frequency band resource.

In embodiments of the present disclosure, the ground station or the base station installed on the ground can send the second notification message to the satellite on the second preset frequency band resource as agreed in the protocol, after the satellite arrives in the current region. The second preset frequency band resource is the frequency band resource available for the ground station or base station to send the second notification message as agreed in the protocol, and the second notification message is used to indicate at least one second frequency band determined by the ground station or base station for the satellite. The second preset frequency band resource may be the same or different from the first preset frequency band resource agreed in the protocol, and this disclosure does not limit this.

In the above embodiments, the ground station or base station installed on the ground determines at least one available second frequency band for the satellite based on at least one first frequency band available for the land communication system in the current region. When the satellite arrives in the current region, at least one second frequency band is notified to the satellite on the second preset frequency band resource, so that the satellite can adjust the available spectrum resources when it is in the current region, which can also effectively solve the interference problem between the satellite communication system and the land communication system.

In the third implementation, the frequency band available for the satellite communication system in the current region is dynamically perceived by ground stations or terminals.

Figure 7:
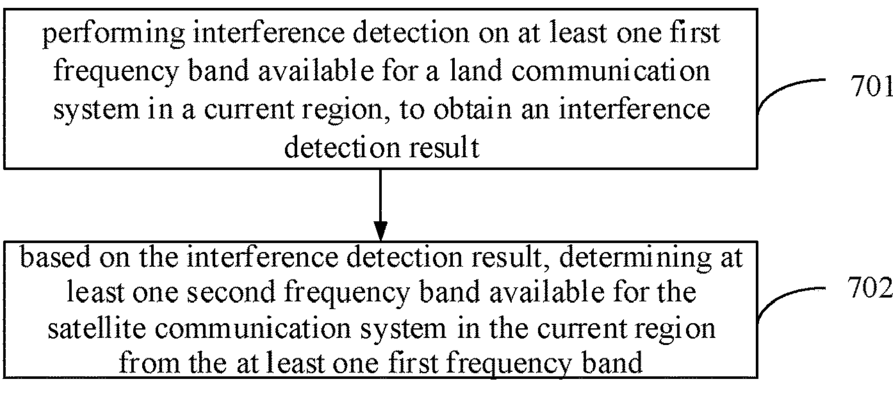
FIG. 7 is a schematic flowchart of another method for determining satellite frequency bands according to an exemplary embodiment.

Referring to FIG. 7, which is a flowchart of a method for determining satellite frequency bands according to an embodiment, the method may be applied to a ground station or a terminal. The method may include the following steps.

In step 701, interference detection is performed on at least one first frequency band available for a land communication system in a current region, to obtain an interference detection result.

In one possible implementation, a ground station or a terminal can perform interference detection on at least one first frequency band available for the land communication system in the current region during a time period without satellite service.

In step 702, based on the interference detection result, at least one second frequency band available for the satellite communication system in the current region is determined in the at least one first frequency band.

In the above embodiments, interference detection can be performed by the ground station or terminal on at least one first frequency band available for the land communication system in the current region, thereby determining at least one second frequency band available for the satellite communication system in the current region based on the interference detection result. Moreover, when the satellite arrives in the current region, the at least one second frequency band may be notified to the satellite, so that the satellite can adjust the available spectrum resources when it is in the current area, which can effectively solve the interference problem between the satellite communication system and the land communication system.

Figure 8:
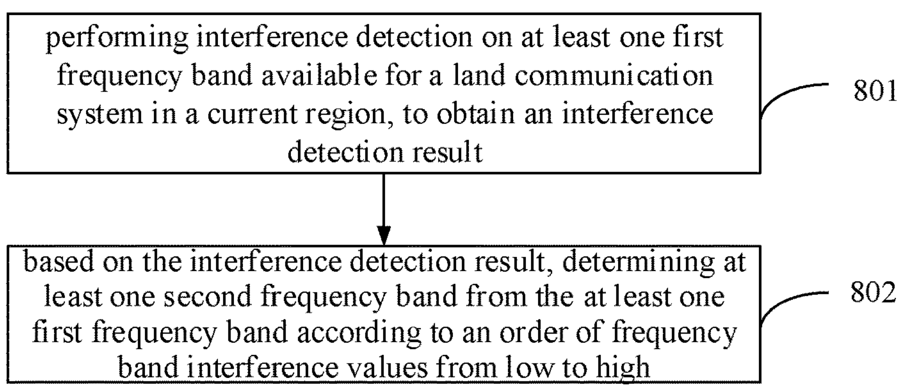
FIG. 8 is a schematic flowchart of another method for determining satellite frequency bands according to an exemplary embodiment.

Referring to FIG. 8, which is a flowchart of a method for determining satellite frequency bands according to an embodiment, the method may be applied to a ground station or a terminal. The method may include the following steps.

In step 801, interference detection is performed on at least one first frequency band available for a land communication system in a current region, to obtain an interference detection result.

In one possible implementation, a ground station or a terminal can perform interference detection on at least one first frequency band during a time period without satellite service.

In step 802, based on the interference detection result, at least one second frequency band is determined from the at least one first frequency band according to an order of frequency band interference values from low to high.

In the above embodiments, the ground station or terminal can determine at least one second frequency band based on the interference detection result, in the order of interference values from low to high, that is, prioritize the frequency band with less interference in the frequency bands available for the land communication system as the frequency band available for the satellite communication system, achieving the goal of effectively solving the interference problem between the satellite communication system and the land communication system, with high usability.

Figure 9:
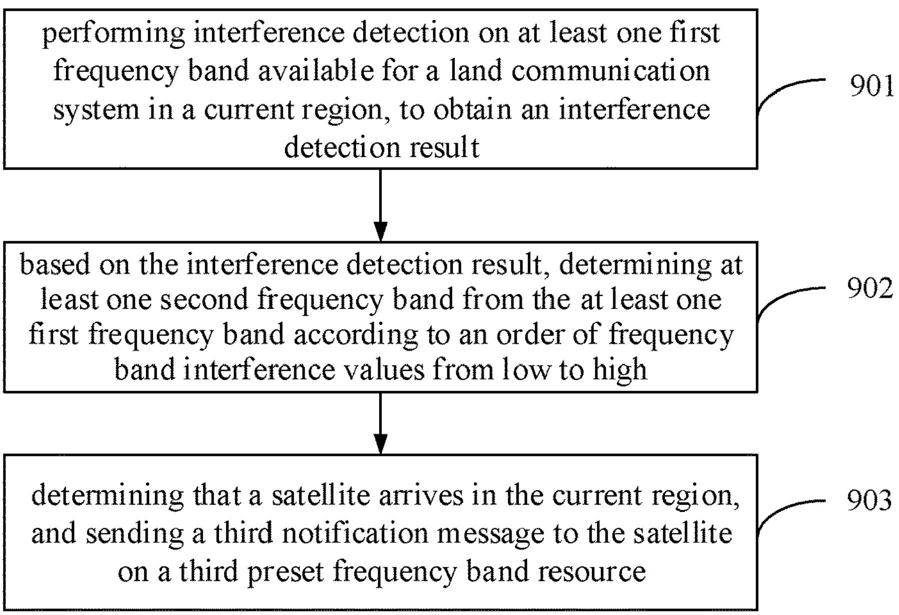
FIG. 9 is a schematic flowchart of a method for determining satellite frequency bands according to an exemplary embodiment.

Referring to FIG. 9, which is a flowchart of a method for determining satellite frequency bands according to an embodiment, the method may be applied to a ground station, and the method may include the following steps.

In step 901, interference detection is performed on at least one first frequency band available for a land communication system in a current region, to obtain an interference detection result.

In embodiments of the present disclosure, a ground station or a terminal can perform interference detection on at least one first frequency band during a time period without satellite service.

In step 902, based on the interference detection result, at least one second frequency band is determined from the at least one first frequency band according to an order of frequency band interference values from low to high.

In step 903, it is determined that a satellite arrives in the current region, and a third notification message is sent to the satellite on a third preset frequency band resource.

In embodiments of the present disclosure, the third preset frequency band resource is a frequency band resource available for the ground station to send the third notification message as agreed in the protocol, and the third notification message is used to indicate at least one second frequency band determined by the ground station for the satellite. The third preset frequency band resource may be the same or different from the aforementioned second preset frequency band resource and first preset frequency band resource as agreed in the protocol, and this disclosure does not limit this. In the above embodiment, after determining at least one second frequency band, the ground station can send the third notification message to the satellite using the third preset frequency band resource, so that the satellite can adjust its available spectrum resources in the future, effectively solving the interference problem between the satellite communication system and the land communication system.

In embodiments of the present disclosure, in addition to the scheme for determining satellite frequency bands mentioned above, a scheme for adjusting frequency bands is also provided.

Referring to FIG. 10, which is a flowchart of a method for adjusting frequency bands according to an embodiment, the method may be applied to a satellite, and the method may include the following steps.

In step 1001, based on at least one second frequency band available for a satellite communication system in a current region, spectrum resources available when the satellite is in the current region is adjusted.

In one possible implementation, the at least one second frequency band may be determined by the satellite itself. The satellite can determine at least one first frequency band available for the land communication system in the current region based on the frequency bands available for the land communication system in each region which are obtained in advance. Furthermore, the satellite determines the at least one second frequency band whose interference value with the at least one first frequency band is less than a predetermined threshold. After determining the at least one second frequency band, the satellite can adjust the available spectrum resources when it is in the current region based on the at least one second frequency band.

In another possible implementation, at least one second frequency band may be determined by a ground station or a base station installed on the ground, and accordingly, the satellite determines the at least one second frequency band based on the received second notification message sent by the ground station or the base station installed on the ground. After determining the at least one second frequency band, the satellite can adjust the available spectrum resources in the current region based on the at least one second frequency band. In another possible implementation, at least one second frequency band can be dynamically perceived by the ground station or terminal, and accordingly, the satellite determines at least one second frequency band based on the received third notification message sent by the ground station. After determining at least one second frequency band, the satellite can adjust the available spectrum resources in the current region based on the at least one second frequency band.

In the above embodiments, the satellite can adjust the available spectrum resources in the current region based on the at least one determined second frequency band. As at least one second frequency band has the minimal interference with at least one first frequency band available for the land communication system in the current region, this effectively solves the interference problem between the satellite communication system and the land communication system.

In one possible implementation, the base station can be installed on the satellite, and after the satellite determines at least one second frequency band, it can directly adjust the spectrum resources available when the satellite is in the current region based on at least one second frequency band indicated by the frequency band notification message.

In another possible implementation, the base station is installed on the ground, and after the ground station sends the frequency band notification message to the satellite, the satellite also needs to adjust the available spectrum resources when the satellite is in the current region according to the indication of the base station.

In the above embodiments, the base station can be directly installed on the satellite, and the satellite can adjust the available spectrum resources when in the current region based on the determined second frequency band. Alternatively, if the base station is still installed on the ground, after the satellite determines the second frequency band, the satellite still needs to adjust the available spectrum resources when the satellite is in the current region according to the indication of the base station, which is easy to implement and has high usability.

In some optional embodiments, as shown in FIG. 11, which is a flowchart of a method for determining satellite frequency bands and adjusting frequency bands according to an embodiment, the method may include the following steps.

In step 1101, the satellite determines at least one first frequency band available for a land communication system in a current region based on available frequency bands of the land communication system in each region.

In step 1102, the satellite determines at least one second frequency band whose interference value with the at least one first frequency band is less than a preset threshold.

In step 1103, the satellite adjusts the spectrum resources available when the satellite is in the current region based on the at least one second frequency band.

In the above embodiments, the base station can be located on a satellite, and of course, the core network and application service functions can also be located on the satellite. The satellite determines at least one available second frequency band in different regions and adjusts its available spectrum resources. There is no need to inform the ground station of at least one second frequency band. The terminal will search for satellite signals on all possible frequency bands of the satellite, in order to obtain the service frequency band of the satellite, effectively solving the interference problem between the satellite communication system and the land communication system, with high usability.

In some optional embodiments, as shown in FIG. 12, which is a flowchart of a method for determining satellite frequency bands and adjusting frequency bands according to an embodiment, the method may include the following steps.

In step 1201, the satellite determines at least one first frequency band available for a land communication system in a current region based on available frequency bands of the land communication system in each region.

In step 1202, the satellite determines at least one second frequency band whose interference value with the at least one first frequency band is less than a preset threshold.

In step 1203, the satellite adjusts the spectrum resources available when the satellite is in the current region based on the at least one second frequency band.

In step 1204, the satellite sends a first notification message to a ground station on a first preset frequency band resource.

The first preset frequency band resource is the frequency band resource available for the satellite to send the first notification message in the current region as agreed in the protocol, and the first notification message is used to indicate at least one second frequency band available for the satellite in the current region.

In the above embodiments, the base station can be located on a satellite, and the core network and application service functions can also be located on the satellite. At least one second frequency band determined by the satellite is sent to the ground station, so that the ground station can determine the service frequency band used by the satellite and inform the terminal of the service frequency band used by the satellite. The terminal can directly search for satellite signals on the service frequency band of the satellite, effectively solving the interference problem between the satellite communication system and land communication system, while saving terminal resources for searching satellite signals.

In some optional embodiments, as shown in FIG. 13, which is a flowchart of a method for determining satellite frequency bands and adjusting frequency bands according to an embodiment, the method may include the following steps.

In step 1301, the ground station or base station installed on the ground determines at least one first frequency band available for the land communication system in the current region.

In step 1302, the ground station or the base station installed on the ground determines at least one second frequency band whose interference value with the at least one first frequency band is less than the preset threshold.

In step 1303, the ground station or the base station installed on the ground determines that the satellite arrives in the current region, and sends a second notification message to the satellite on the second preset frequency band resource. The second preset frequency band resource is the frequency band resource available when the ground station or base station sends the second notification message as agreed in the protocol. The second notification message is used to indicate at least one second frequency band determined by the ground station or base station for the satellite.

In step 1304, the satellite adjusts the available spectrum resources when the satellite is in the current region based on at least one second frequency band indicated by the second notification message and the indication of the base station.

In the above embodiments, the base station is installed on the ground, and at least one second frequency band is determined by the ground station or base station for the satellite. The satellite can adjust the spectrum resources available when the satellite is in the current region based on at least one second frequency band indicated by the second notification message and the indication of the base station. This effectively solves the interference problem between the satellite communication system and the land communication system.

Figure 14:
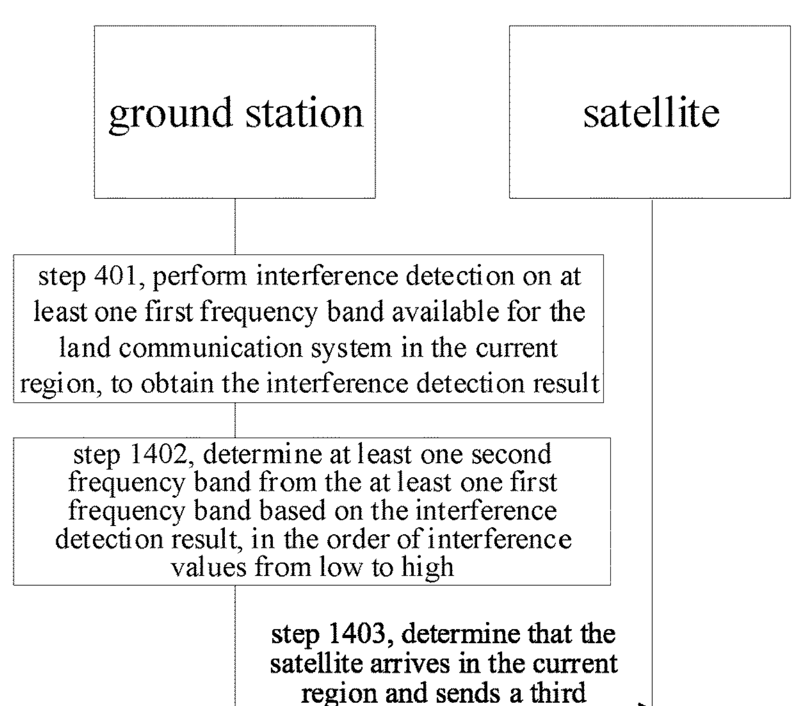
FIG. 14 is a schematic flowchart of another method for determining satellite frequency bands and adjusting frequency bands according to an exemplary embodiment.

In some optional embodiments, as shown in FIG. 14, which is a flowchart of a method for determining satellite frequency bands and adjusting frequency bands according to an embodiment, the method may include the following steps.

In step 401, the ground station performs interference detection on at least one first frequency band available for the land communication system in the current region, to obtain the interference detection result.

In embodiments of the present disclosure, interference detection may also be performed by the terminal on the at least one first frequency band available for the land communication system in the current region, to obtain the interference detection result (not shown in FIG. 14).

In step 1402, the ground station determines at least one second frequency band from the at least one first frequency band based on the interference detection result, in the order of interference values from low to high.

In embodiments of the present disclosure, the at least one second frequency band may also be determined by the terminal (not shown in FIG. 14).

In step 1403, the ground station determines that the satellite has arrived in the current region and sends a third notification message to the satellite on a third preset frequency band resource. The third preset frequency band resource is the frequency band resource available when the ground station sends the third notification message as agreed in the protocol. The third notification message is used to indicate the at least one second frequency band determined by the ground station for the satellite.

In embodiments of the present disclosure, if the terminal determines at least one second frequency band, the at least one second frequency band can be sent to the ground station (not shown in FIG. 14), so that the ground station can send the third notification message to the satellite after determining that the satellite has arrived in the current region.

In step 1404, the satellite adjusts the spectrum resources available when the satellite is in the current region based on at least one second frequency band indicated by the third notification message, or adjusts the spectrum resources available when the satellite is in the current region based on at least one second frequency band indicated by the third notification message and the indication of the base station.

In embodiments of the present disclosure, if the base station is installed on a satellite, the satellite can directly adjust the spectrum resources available when the satellite is in the current region based on at least one second frequency band indicated by the third notification message. If the base station is installed on the ground, the satellite can adjust the spectrum resources available when the satellite is in the current region based on at least one second frequency band indicated by the third notification message and the indication of the base station. Correspondingly to the aforementioned embodiments of implementing the method, this disclosure also provides embodiments of implementing the apparatus.

Figure 15:
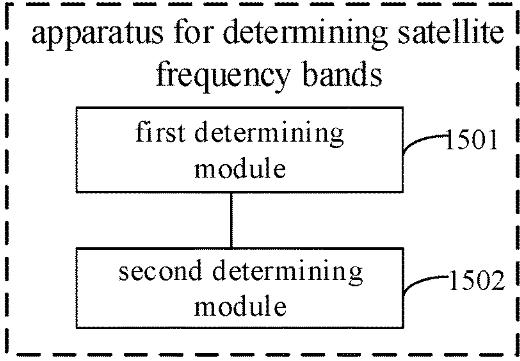
FIG. 15 is a block diagram of an apparatus for determining satellite frequency bands according to an exemplary embodiment.

Referring to FIG. 15, which shows an apparatus for determining satellite frequency bands according to an exemplary embodiment, the apparatus includes a first determining module 1501 and a second determining module 1502.

The first determining module 1501 is configured to determine at least one first frequency band available for a land communication system in a current region.

The second determining module 1502 is configured to determine at least one second frequency band available for a satellite communication system in the current region, based on the at least one first frequency band.

In one possible implementation, the apparatus may be applied to a satellite. In another possible implementation, the apparatus may be applied to a ground station or a base station located on the ground.

Figure 16:
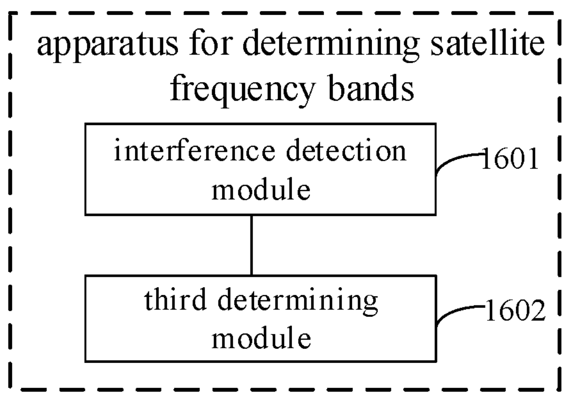
FIG. 16 is a block diagram of another apparatus for determining satellite frequency bands according to an exemplary embodiment.

Referring to FIG. 16, which shows an apparatus for determining satellite frequency bands according to an exemplary embodiment, the apparatus includes an interference detection module 1601 and a third determining module 1602.

The interference detection module 1601 is configured to perform interference detection on at least one first frequency band available for a land communication system in a current region, to obtain an interference detection result.

The third determining module 1602 is configured to determine at least one second frequency band available for a satellite communication system in the current region from the at least one first frequency band based on the interference detection result.

Optionally, the apparatus may be applied to a ground station or a terminal.

Figure 17:
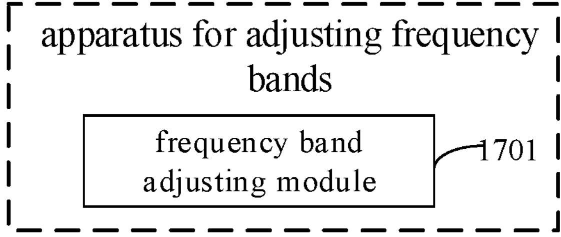
FIG. 17 is a block diagram of an apparatus for adjusting frequency bands according to an exemplary embodiment.

Referring to FIG. 17, which shows an apparatus for adjusting frequency bands according to an exemplary embodiment, the apparatus is applied to a satellite and includes a frequency band adjusting module 1701.

The frequency band adjusting module 1701 is configured to adjust spectrum resources available when the satellite is in a current region, based on at least one second frequency band available for a satellite communication system in the current region.

For the apparatus embodiments, since they basically correspond to method embodiments, please refer to the partial explanation of method embodiments for relevant information. The apparatus embodiments described above are only schematic, where the units described as separate components may be or may not be physically separated, and the components shown as units may be or may not be physical units, that is, they may be located in one place or distributed across multiple network units. Some or all modules can be selected according to actual needs to achieve the purpose of this disclosed solution. Ordinary technical personnel in this field can understand and implement without creative labor.

Correspondingly, this disclosure also provides an apparatus for determining satellite frequency bands, including:

a processor; and a memory, configured to store instructions executable by the processor, wherein the processor is configured to implement the method for determining satellite frequency bands described above in any embodiment.

Figure 18:
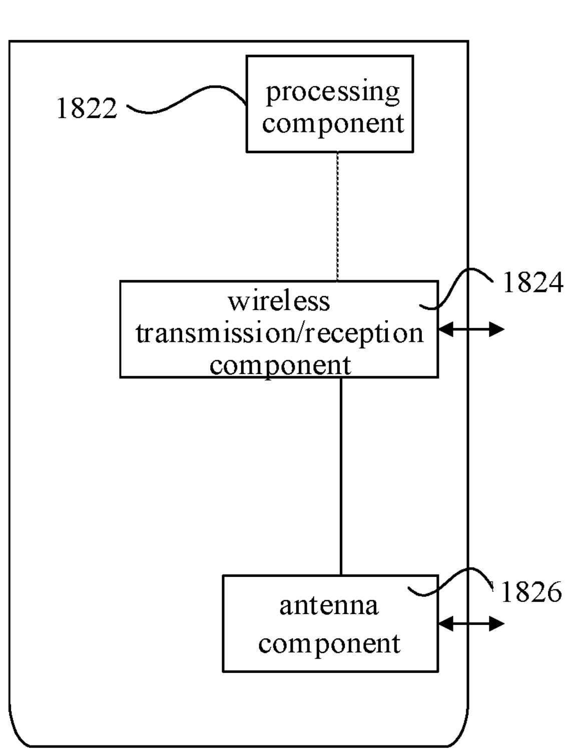
FIG. 18 is a block diagram of a device for determining satellite frequency bands according to an exemplary embodiment.

As shown in FIG. 18, FIG. 18 is a schematic diagram of a device 1800 for determining satellite frequency bands according to an exemplary embodiment. The device 1800 may be provided as a satellite, a ground station, or a base station located on the ground, or a terminal. Referring to FIG. 18, the device 1800 includes a processing component 1822, a wireless transmission/reception component 1824, an antenna component 1826, and a signal processing component unique to the wireless interface. The processing component 1822 may further include one or more processors.

One of the processors in the processing component 1822 can be configured to perform any of the methods for determining satellite frequency bands described above.

Correspondingly, this disclosure also provides an apparatus for adjusting frequency bands, including:

a processor; and a memory, configured to store instructions executable by the processor, wherein the processor is configured to implement the method for adjusting frequency bands described above in any embodiment.

Figure 19:
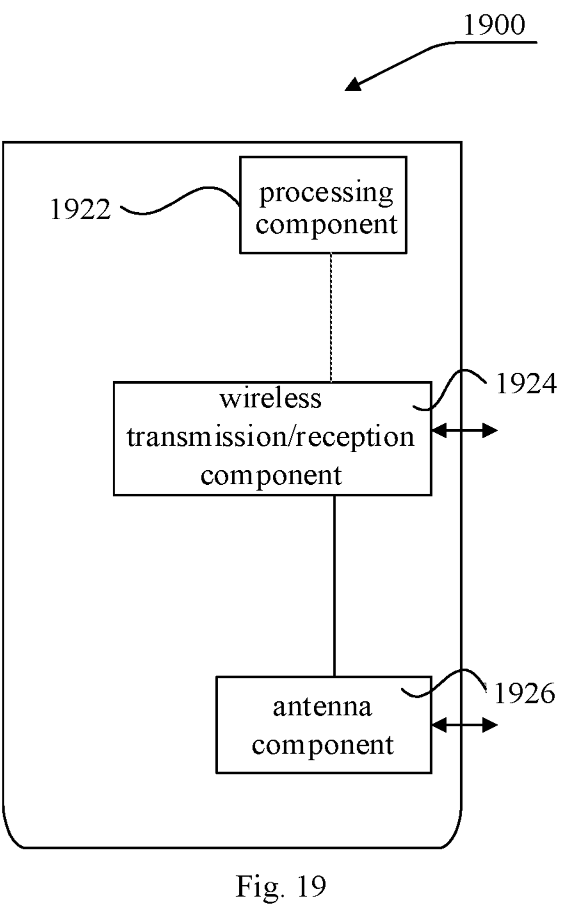
FIG. 19 is a block diagram of a device for adjusting frequency bands according to an exemplary embodiment.

As shown in FIG. 19, FIG. 19 is a schematic block diagram of a device 1900 for adjusting frequency bands according to an exemplary embodiment. The device 1900 may be provided as a satellite. Referring to FIG. 19, the device 1900 includes a processing component 1922, a wireless transmission/reception component 1924, an antenna component 1926, and a signal processing component unique to the wireless interface. The processing component 1922 may further include one or more processors.

One of the processors in the processing component 1922 can be configured to perform any of the methods for adjusting frequency bands described above.

Other embodiments of the disclosure will be apparent to those skilled in the art from consideration of the specification and practice of the disclosure disclosed herein. This disclosure is intended to cover any variations, uses, or adaptations of the disclosure following the general principles thereof and including such departures from the disclosure as come within known or customary practice in the art. It is intended that the specification and examples be considered as exemplary only.

It will be appreciated that the disclosure is not limited to the exact construction that has been described above and illustrated in the accompanying drawings, and that various modifications and changes can be made without departing from the scope thereof.

What is claimed is:

1. A method for determining satellite frequency bands, comprising:

determining at least one first frequency band available for a land communication system in a current region; and determining at least one second frequency band available for a satellite communication system in the current region, based on the at least one first frequency band;

wherein the method is performed by a satellite, and determining the at least one first frequency band available for the land communication system in the current region comprises:

determining the at least one first frequency band available for the land communication system in the current region, based on the available frequency bands of the land communication system in each region; and sending a first notification message to a ground station on a first preset frequency band resource, wherein the first preset frequency band resource is a frequency band resource available for the satellite to send the first notification message in the current region as agreed in a protocol, and the first notification message is used to indicate at least one second frequency band available for the satellite in the current region.

2. The method of claim 1, wherein determining at least one second frequency band available for the satellite communication system in the current region, based on the at least one first frequency band, comprises:

determining the at least one second frequency band whose interference value with the at least one first frequency band is less than a predetermined threshold.

3. The method of claim 1, wherein a ground station or a base station installed on the ground determines that a satellite arrives in the current region, and sends a second notification message to the satellite on a second preset frequency band resource, wherein the second preset frequency band resource is a frequency band resource available for the ground station or the base station to send the second notification message as agreed in a protocol, and the second notification message is used to indicate the at least one second frequency band determined by the ground station or the base station for the satellite.

4. A satellite, comprising:

a processor; and a memory configured to store instructions executable by the processor, wherein the processor is configured to implement the method for determining satellite frequency bands according to claim 1.

5. A method for determining satellite frequency bands, comprising:

performing interference detection on at least one first frequency band available for a land communication system in a current region, to obtain an interference detection result; and determining at least one second frequency band available for a satellite communication system in the current region from the at least one first frequency band based on the interference detection result;

wherein the method is performed by a ground station or a terminal, and in response to the method being performed by a ground station, the method further comprises:

determining that a satellite arrives in the current region, and sending a third notification message to the satellite on a third preset frequency band resource, wherein the third preset frequency band resource is a frequency band resource available for the ground station to send the third notification message as agreed in a protocol, and the third notification message is used to indicate the at least one second frequency band determined by the ground station for the satellite.

6. The method of claim 5, wherein determining at least one second frequency band available for a satellite communication system in the current region from the at least one first frequency band based on the interference detection result comprises:

determining the at least one second frequency band from the at least one first frequency band according to an order of frequency band interference values from high to low, based on the interference detection result.

7. A ground station, comprising:

a processor; and a memory configured to store instructions executable by the processor, wherein the processor is configured to implement the method for determining satellite frequency bands according to claim 5.

8. A method for adjusting frequency bands, performed by a satellite, comprising:

adjusting spectrum resources available when the satellite is in a current region, based on at least one second frequency band available for a satellite communication system in the current region;

wherein the at least one second frequency band is determined by the satellite, or, the at least one second frequency band is indicated by a frequency band notification message received by the satellite;

in response to the at least one second frequency band being indicated by the frequency band notification message received by the satellite, adjusting the spectrum resources available for the satellite comprises:

determining that a base station is installed on the satellite, and adjusting the spectrum resources available when the satellite is in the current region based on the at least one second frequency band indicated by the frequency band notification message; or, determining that the base station is installed on the ground, and adjusting the spectrum resources available when the satellite is in the current region based on the second frequency band indicated by the frequency band notification message and indication of the base station.

9. A satellite, comprising:

a processor; and a memory configured to store instructions executable by the processor, wherein the processor is configured to implement the method for adjusting frequency bands according to claim 8.

* * * * *